United States Patent [19]
Olson et al.

[11] Patent Number: 5,147,010
[45] Date of Patent: Sep. 15, 1992

[54] METHOD AND APPARATUS FOR CONTROLLING A SUPPLEMENTAL VEHICLE DRIVE IN RESPONSE TO SLIP IN A MAIN VEHICLE DRIVE

[75] Inventors: Stephen R. Olson; William J. Tate, both of Peoria, Ill.

[73] Assignee: Caterpillar Inc., Peoria, Ill.

[21] Appl. No.: 623,630

[22] Filed: Dec. 6, 1990

[51] Int. Cl.$^5$ .................... B60K 28/16; B60K 17/356
[52] U.S. Cl. .................... 180/197; 180/243; 180/308; 364/424.1
[58] Field of Search ............... 180/243, 197, 242, 306, 180/307, 308, 900, 338, 24.1; 364/426.02, 424.1

[56] References Cited

U.S. PATENT DOCUMENTS

| | | | |
|---|---|---|---|
| 3,344,993 | 10/1967 | Wilder et al. | 239/164 |
| 3,894,606 | 7/1975 | Hunck et al. | 180/243 |
| 3,918,546 | 11/1975 | Chichester et al. | 180/243 |
| 4,177,870 | 12/1979 | Henn | 180/14.3 X |
| 4,183,419 | 1/1980 | Henn et al. | 180/243 |
| 4,186,816 | 2/1980 | Pfundstein | 180/243 |
| 4,236,595 | 12/1980 | Beck et al. | 180/243 |
| 4,346,774 | 8/1982 | Hirota et al. | 180/197 X |
| 4,444,286 | 4/1984 | Hawkins et al. | 180/197 |
| 4,635,743 | 1/1987 | Riehl | 180/243 |
| 4,976,332 | 12/1990 | Hein | 180/197 |

FOREIGN PATENT DOCUMENTS

| | | |
|---|---|---|
| 0224144A1 | 6/1987 | European Pat. Off. . |
| 3620163A1 | 12/1987 | Fed. Rep. of Germany . |
| 2192160A | 1/1988 | United Kingdom . |

OTHER PUBLICATIONS

Patent Abstracts of Japan, vol. 10, No. 181 (M-492 (2237) 25 Jun. 1986 & JP-A-61 27729 (Aisin Warner 7 Feb. 1986).
Pg. 16, of Jan., 1990, issue of OEM Magazine.

Primary Examiner—Charles A. Marmor
Assistant Examiner—Kevin Hurley
Attorney, Agent, or Firm—Kirk A. Vander Leest

[57] ABSTRACT

An electronic control is provided for a vehicle having an engine, a main drive driven by the engine, a fluid pump driven by the engine for providing pressurized fluid, and a supplemental drive driven by the pressurized fluid. The electronic control includes a main drive sensor for sensing the speed of the main drive and responsively producing a main drive speed signal. A vehicle speed sensor senses the speed of the vehicle relative to the ground and produces a vehicle ground speed signal. A pressure sensor senses the pressure of the pressurized fluid supplied to the supplemental drive by the pump and responsively produces an actual pressure signal. A processor receives the main drive speed, vehicle ground speed, and actual pressure signals, produces a slip ratio signal responsive to a ratio of the main drive speed and vehicle ground speed signals, produces a desired pressure signal responsive to the slip ratio signal, produces an error signal responsive to a difference between the desired and actual pressure signals, and controls the fluid pressure in the supplemental drive in response to the error signal.

19 Claims, 11 Drawing Sheets

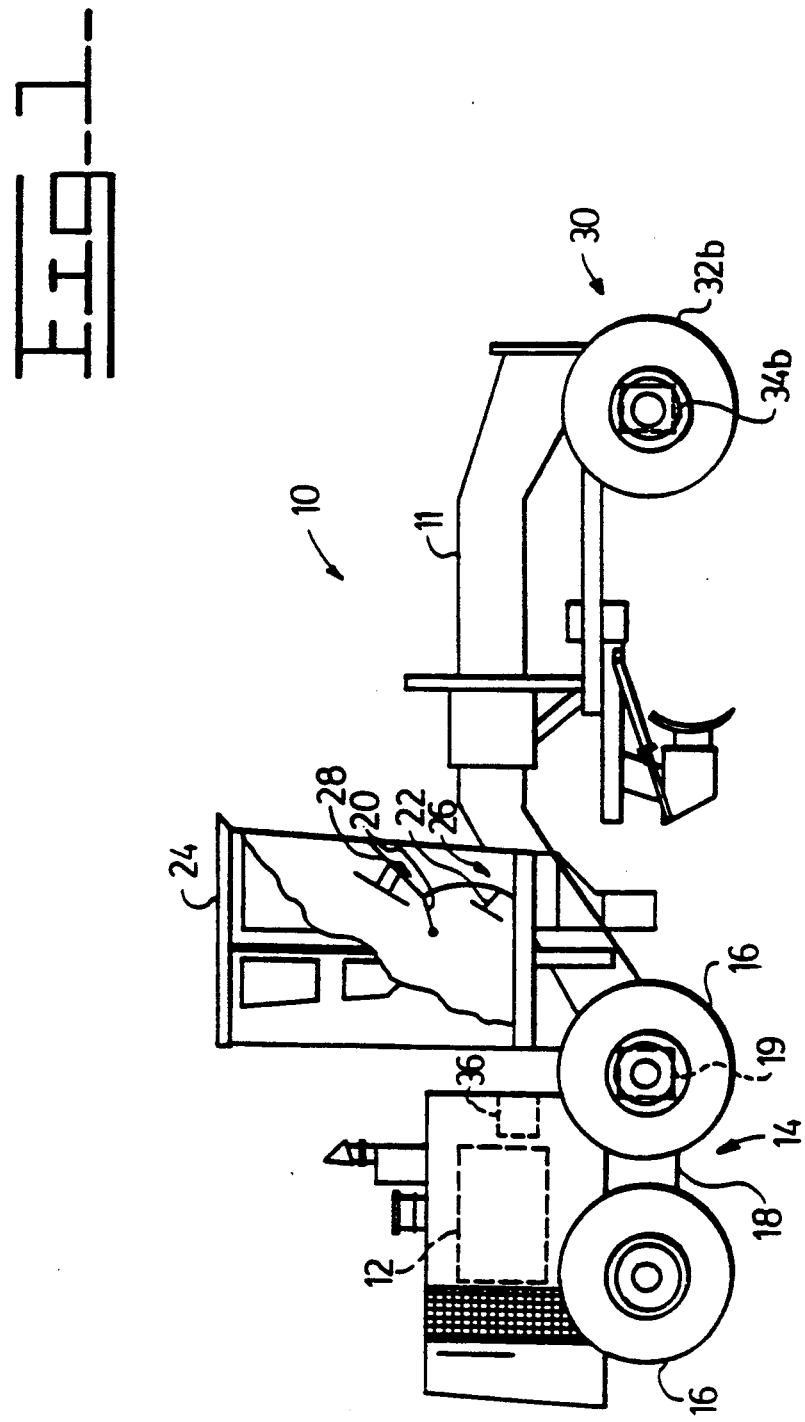

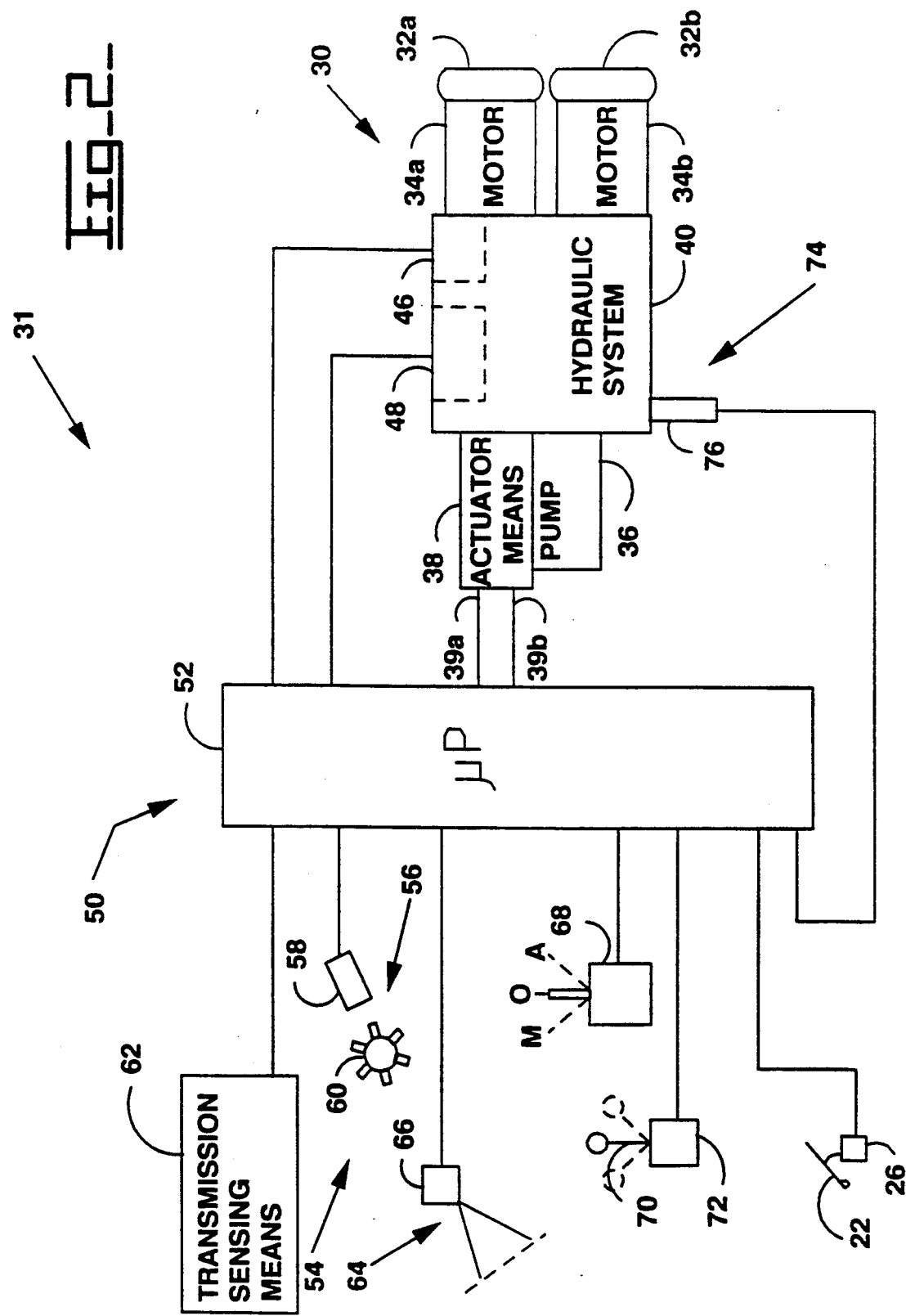

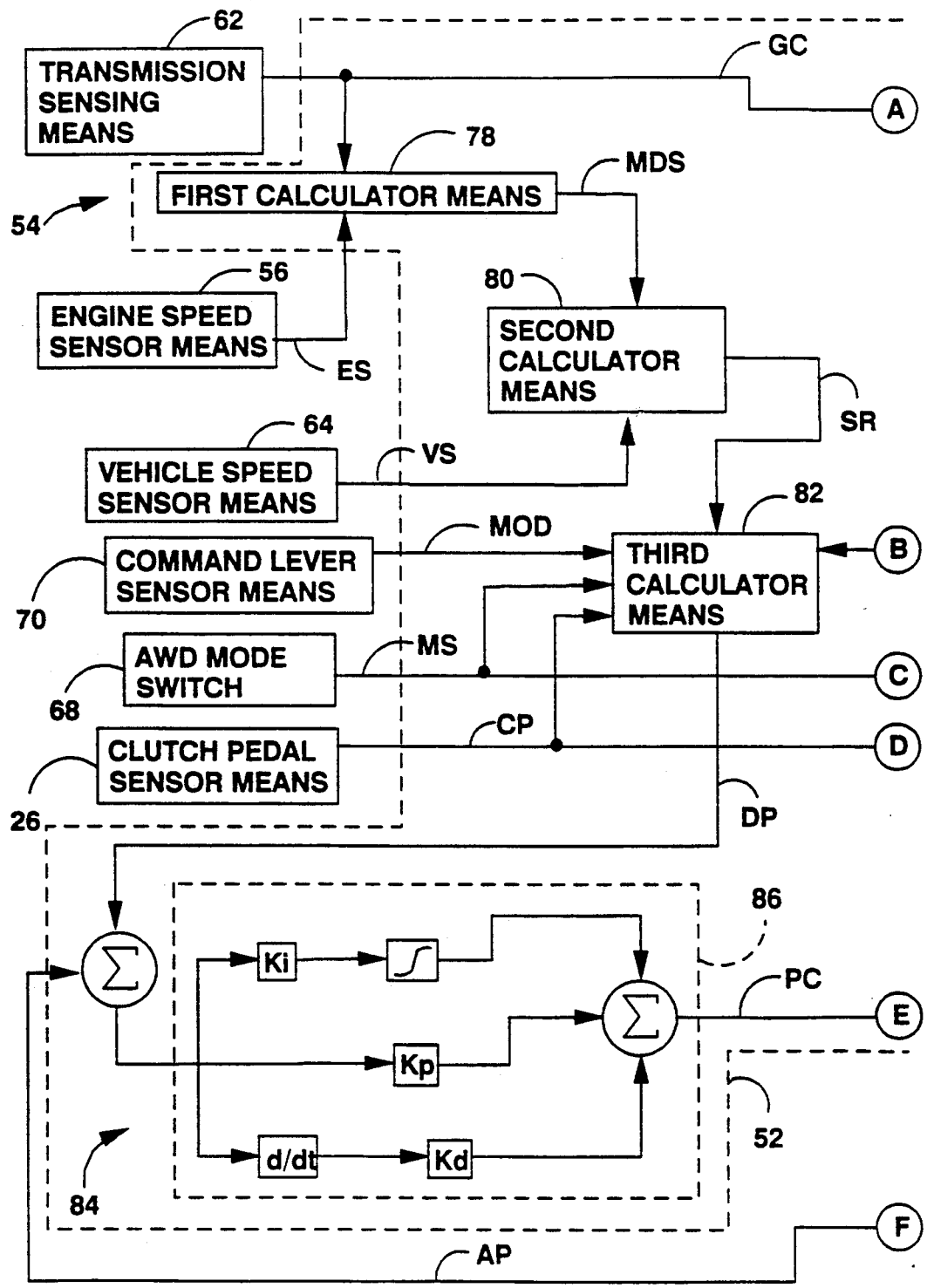
Fig_4A

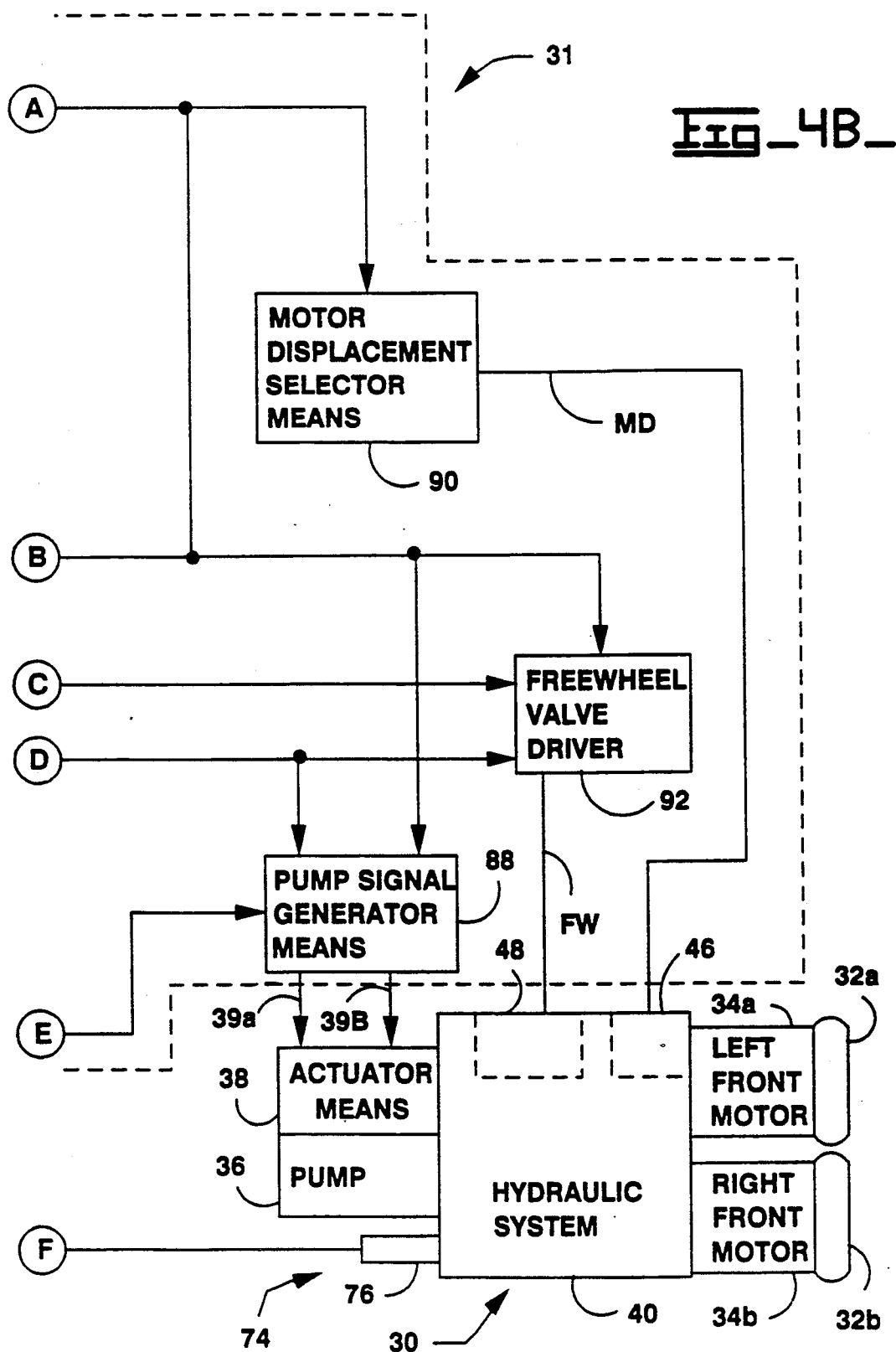
Fig_4B_

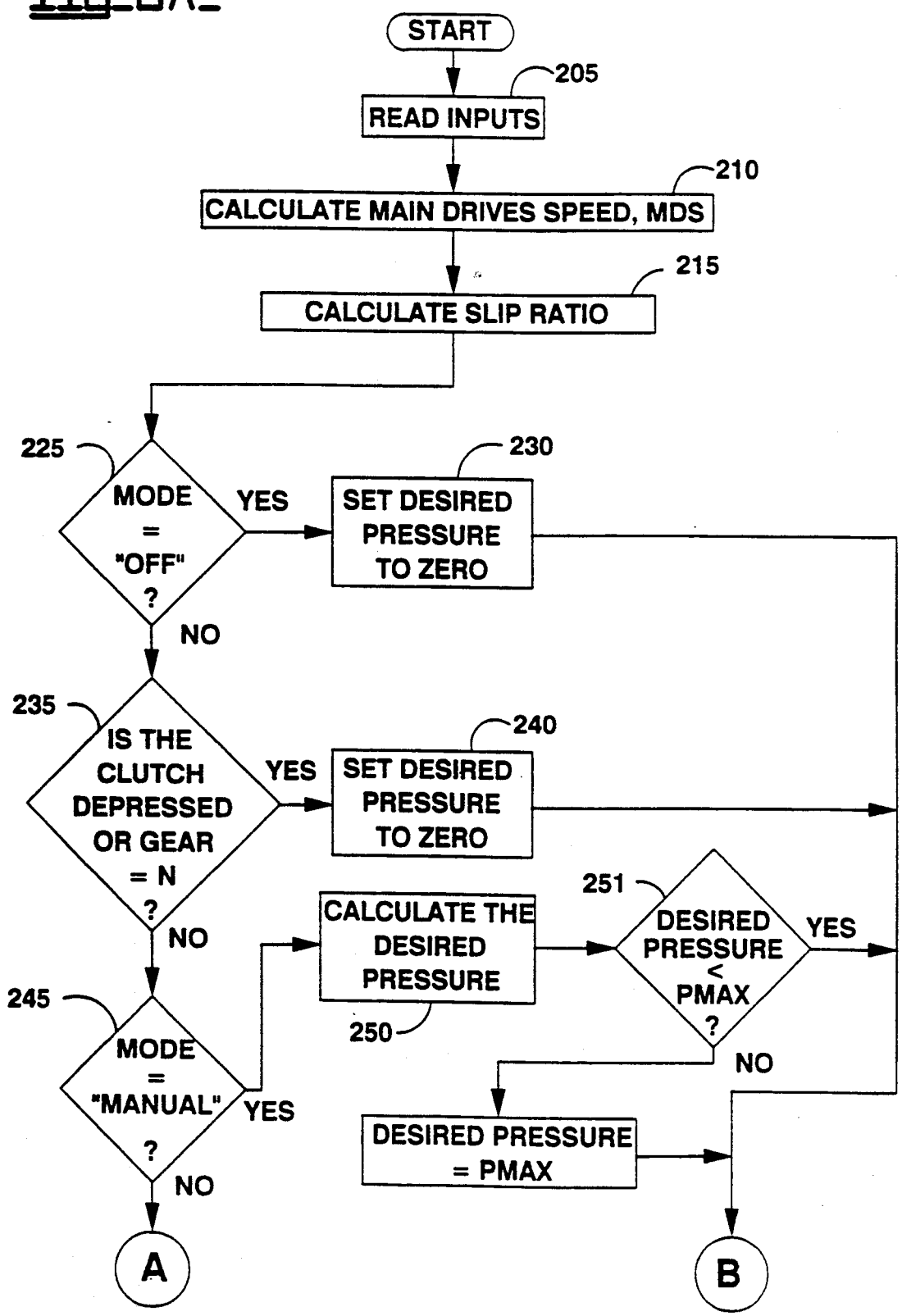

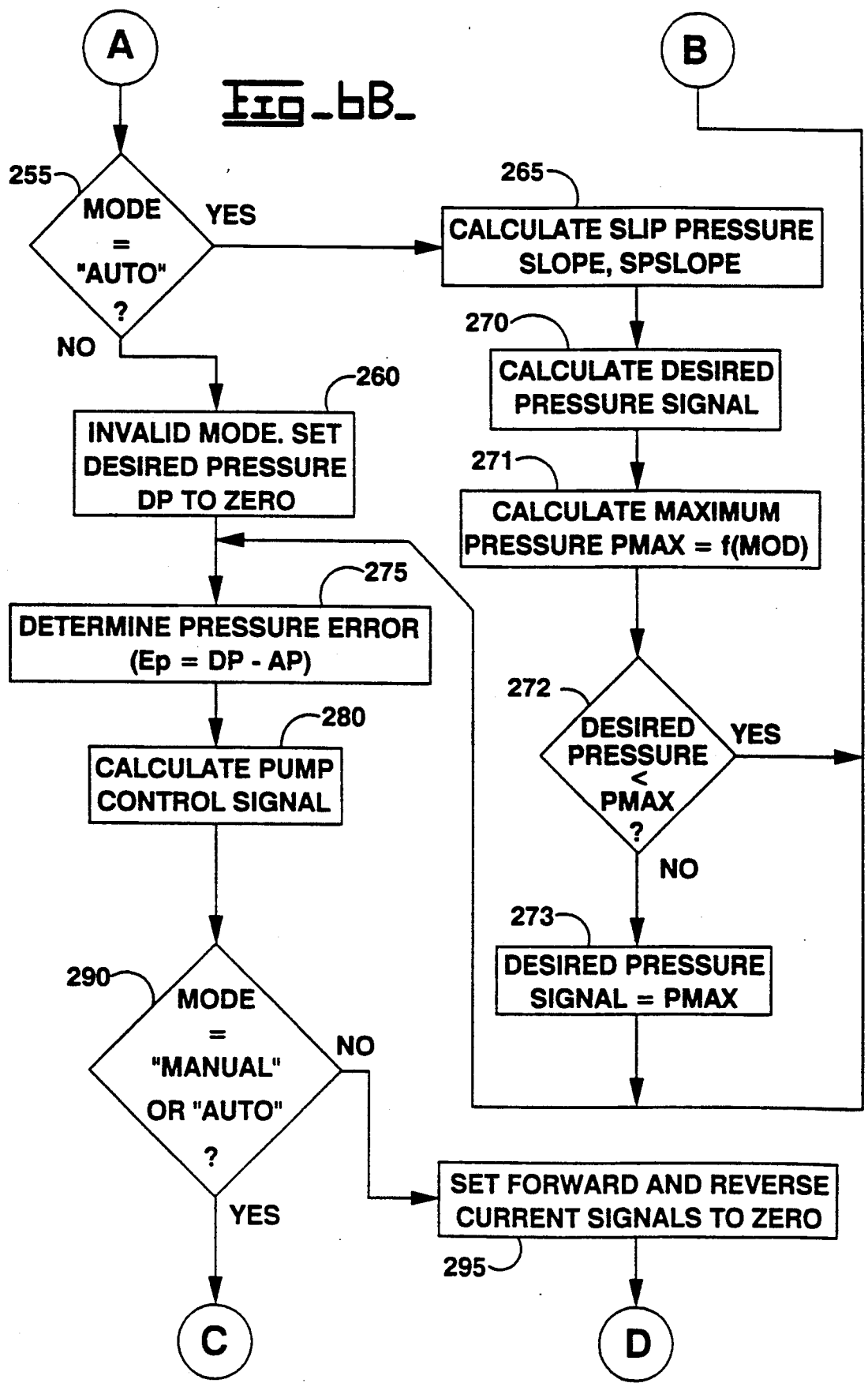

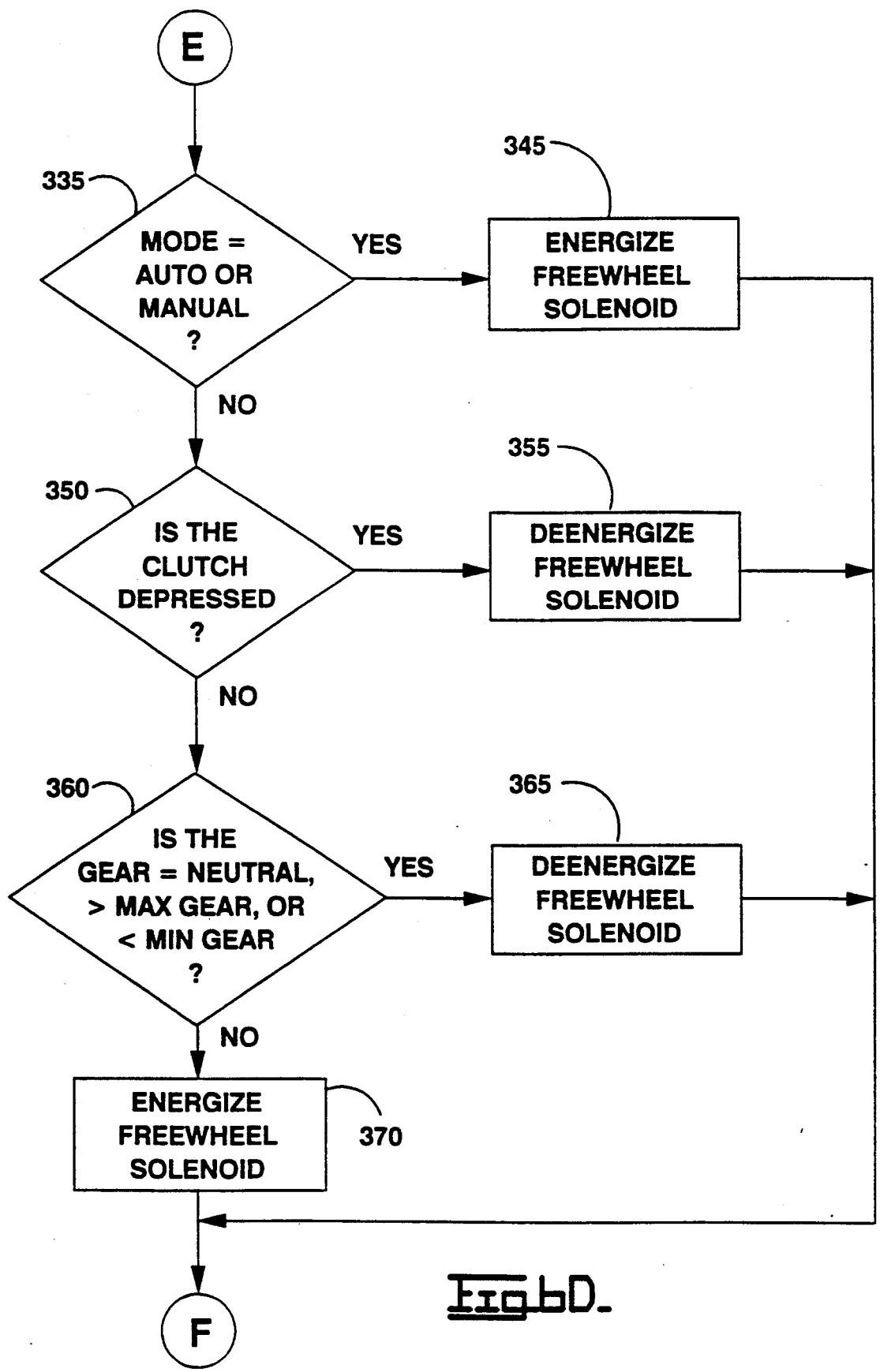

METHOD AND APPARATUS FOR CONTROLLING A SUPPLEMENTAL VEHICLE DRIVE IN RESPONSE TO SLIP IN A MAIN VEHICLE DRIVE

TECHNICAL FIELD

The present invention relates generally to vehicle drive systems and, more particularly, to an electronic control for a supplemental hydrostatic front wheel drive.

BACKGROUND ART

In motor graders, the rear wheels are usually driven directly by the engine through a transmission and differential gearing. Further, it is known to supplement the main drive by means of a hydrostatic front wheel drive system which includes a fluid pump driven by the engine for providing pressurized fluid to fluid motors. The motors in turn drive the front wheels thereby supplementing the main rear wheel drive. In the past, supplemental hydrostatic drives have been developed which automatically shifted between two or more torque levels in response to the transmission ratio and/or hydraulic system pressure. These systems were continuously powered to provide supplementary hydrostatic drive for the main drive but had no provision for operation only on demand when the main drive loses traction. Moreover, since the supplemental hydrostatic drive is notably less efficient than the main direct drive, it is desirable to reduce unnecessary utilization of the hydrostatic drive.

In some motor graders manufactured by the assignee herein, the vehicle operator is able to manually control the torque produced by the supplemental drive. These vehicles include an open loop control wherein the pump and motor displacement in the supplemental drive are adjusted in response to a manually operable control lever. However, such a system does not provide maximum efficiency since control of the hydrostatic drive is at the operator's discretion. Therefore, it is desirable to provide a system in which operation of the hydrostatic system is automatically controlled to maintain maximum operating efficiency.

One system which attempts to overcome the problems associated prior systems is disclosed in U.S. Pat. No. 4,186,816 which issued to Pfundstein on Feb. 5, 1980, hereinafter referred to as '816. The '816 patent discloses a closed loop electronic speed feedback system for automatically controlling the supplemental drive system of a motor grader. More specifically, closed loop feedback electronics control a servo actuated pump that is connected by a hydraulic system to a pair of front wheel hydrostatic drive motors. The supplemental drive for the motor grader has three modes of operation. The first mode is the "off" mode in which the front drive wheels are free running and unpowered. The second mode is the "normal" mode where the control system allows a predetermined amount speed differential between the main and supplemental drive wheels before the supplemental hydrostatically driven wheels begin to supplement the main drive wheels. The third mode is an "overspeed" mode where the control system provides a predetermined percentage of overspeed of the auxiliary drive wheels to provide a continuous, positive supplementary drive.

As mentioned above, hydrostatic drives are much less efficient than direct drives and, therefore it is desirable to reduce unnecessary utilization of the supplemental hydrostatic drive whenever possible. To facilitate more efficient power utilization, it is desirable to provide a system wherein the responsiveness of the supplemental drive decreases with increasing ground speed. This is because wheel slip in the main drive is more likely to occur at lower vehicle speeds. The '816 system completely disables the supplemental system in higher gear ratios of the main transmission. However, when the supplemental drive is enabled a given speed difference between the front and rear wheels will result in the same level of supplemental assist from the front wheels irrespective of ground speed.

Furthermore, when the '816 system operates in the "aggressive" mode, the supplemental drive system is continuously operated regardless of the degree of slip between the rear wheels and the ground. Under good tractive conditions, such as on dry hard surfaces, the "aggressive" mode should not be used because continued utilization of the supplemental drive is inefficient and undesirable. Instead it is desirable to provide a more responsive system wherein the level of supplemental drive assist is controlled in response to the degree of slip between the rear wheels and ground.

The present invention is directed towards addressing one or more of the problems set forth above.

DISCLOSURE OF THE INVENTION

An electronic control is provided for a vehicle having an engine, a main drive driven by the engine, a fluid pump driven by the engine for providing pressurized fluid, and a supplemental drive driven by the pressurized fluid. The control includes a main drive sensor for sensing the speed of the main drive and responsively producing a main drive speed signal. A vehicle speed sensor senses the speed of the vehicle relative to the ground and produces a vehicle ground speed signal. A pressure sensor senses the pressure of the pressurized fluid supplied to the supplemental drive by the pump and responsively produces an actual pressure signal. A processor receives the main drive speed, vehicle ground speed, and actual pressure signals, produces a slip ratio signal responsive to a ratio of the main drive speed and vehicle ground speed signals, produces a desired pressure signal responsive to the slip ratio signal, calculates an error signal responsive to a difference between the desired and actual pressure signals, and controls the fluid pressure in the supplemental drive in response to the error signal.

BRIEF DESCRIPTION OF THE DRAWINGS

FIG. 1 is a side view of a motor grader schematically illustrating the general location of most of the principal drive components including the supplemental hydrostatic drive;

FIG. 2 is a schematic illustration of an electronic control of an embodiment of the present invention;

FIG. 4 is a block diagram of the electronic control of FIG. 2;

FIGS. 6A-E are flow diagrams which can be used in programming a microprocessor to perform certain functions of the immediate vehicle drive control.

BEST MODE FOR CARRYING OUT THE INVENTION

Figure 3A:
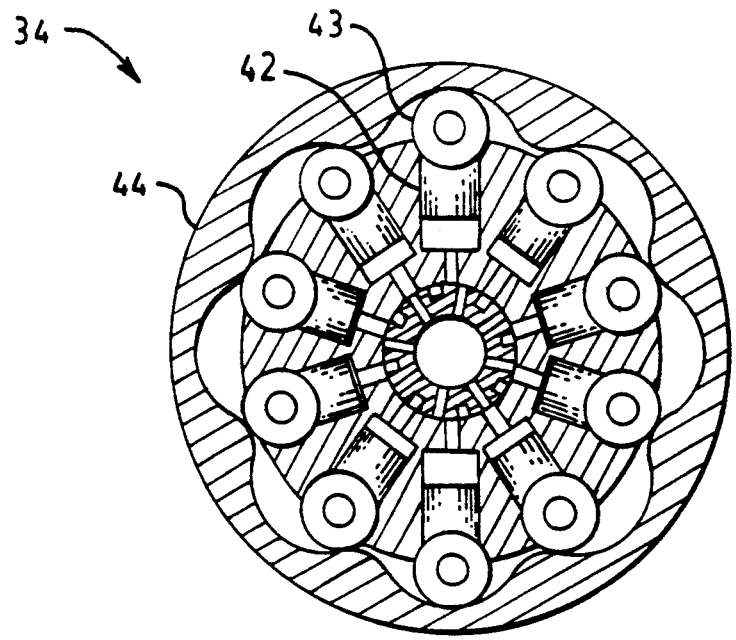
FIGS. 3A-B are schematic illustration showing generally the construction of the hydraulic motors.

FIG. 1 shows a work vehicle 10 and, more particularly, an motor grader 11 having an internal combustion engine 12 driving a main drive 14. The main drive 14 includes a pair of rear wheels 16 driven by the engine 12 through a conventional electronically controlled and hydraulically actuated transmission 18 and a rear differential 19. The transmission 18 is responsive to a gear selector 20 and a clutch pedal 22 which are both located in an operator's compartment 24 of the motor grader 11.

More particularly, a clutch pedal sensor 26 is provided for sensing the position of the clutch pedal and responsively producing a clutch pedal position signal. Preferably, the clutch pedal sensor 26 is in the form of an electrical switch (not shown) which is connected to ground when the clutch pedal 22 is depressed and open potential when the clutch pedal 22 is released. Similarly, a gear selector sensor 28 produces a gear selector signal responsive to the position of the gear selector 20. The gear selector 20 is movable between eight forward gear positions, a neutral position and six reverse gear positions and the gear selector sensor produces a unique output for each of these positions. The clutch pedal signal and gear selector position signals are delivered to transmission solenoids (not shown) for controlling actuation of the transmission 18 in a conventional manner.

Referring to FIG. 2, a supplemental hydrostatic front wheel drive 30 for the motor grader 11 will be discussed. The supplemental drive 30 includes left and right front drive wheels 32a,32b driven by respective hydraulic motors 34a,34b. A hydraulic pump 36 is driven by the engine 12 for providing pressurized fluid to the motors 34a,34b. The hydraulic pump 36 is a reversible variable displacement pump. An actuator means 38 receives a control signal from an electronic control 31 and responsively adjusts the direction and displacement of the pump 36. More specifically, the actuator means 38 includes forward and reverse pump actuators (not shown) which are responsive, respectively, to forward and reverse pump control signals produced by the electronic control 31. The electronic control 31 selectively delivers one of the forward and reverse pump control signals to the forward and reverse pump actuators, respectively, in response to the direction of the main drive 14. It should be understood that a nonreversible pump could be utilized in conjunction with a reversing valve for supplying the pressurized fluid to the motors 34a,34b, as opposed to using the reversible variable displacement pump 36.

Figure 3B:
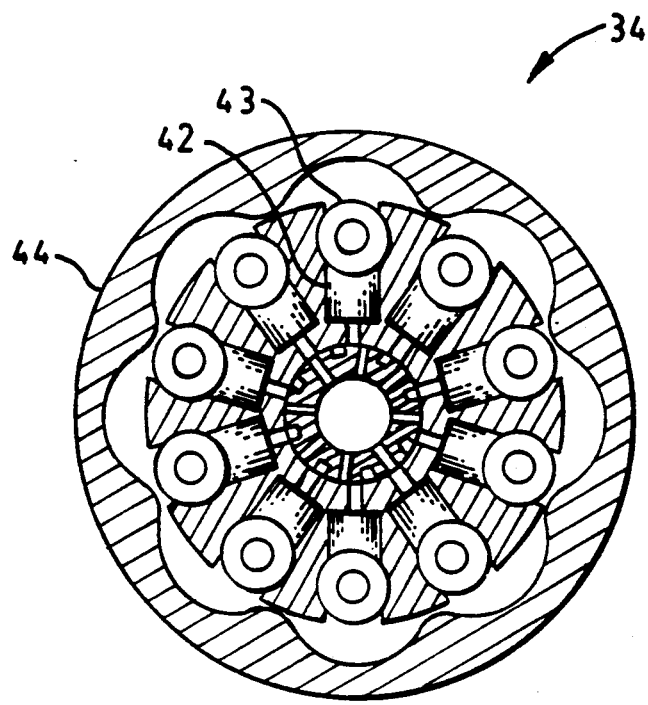

The pressurized fluid is supplied to the motors 34a,34b through a hydraulic system 40 to power the motors 34a,34b and drive the wheels 32a,32b. The hydraulic motors 34a,34b are rotating housing, radial piston designs, one of which is shown generally in FIGS. 3A-B. It should be understood that the type of hydraulic motor used forms no part of the immediate invention and, therefore, only a brief description of the motors 34a,34b will be given. Each motor 34a,34b includes a plurality of pistons 42 having respective rollers 43 which work outwardly against a cam ring 44 to impart rotary motion in the cam ring 44. The cam ring 44 are rigidly connected to and rotatable with respective drive wheels 32a,32b for propelling the vehicle. Each motor 34a,34b includes a rotating distribution valve (not shown) which is timed to selectively direct fluid to and from the pistons 42. In the preferred embodiment, the hydraulic motors 34a,34b are a model H20 as manufactured by Poclain Hydraulics, Inc. of Addison, Ill.

The motors 34a,34b operate at either 100% or 40% displacement. The electronic control 31 determines the gear ratio of the main transmission 18 and responsively delivers a motor displacement control signal to a motor displacement control means 46 for controlling the displacement of the motors 34a,34b. The motors 34a,34b operate at 100% displacement in forward gears 1-4 and reverse gears 1-3, and 40% displacement in forward gears 5-7 and reverse gears 4-5. The motor displacement control means 46 includes an on/off solenoid actuated valve (not shown) for controlling fluid flow to the pistons 42 in response to the motor displacement control signal. More specifically, in the 100% mode the solenoid actuated valve is deenergized, thereby causing the distribution valve to selectively direct fluid flow to all of the pistons 42a-j. Whereas, in the 40% mode, the solenoid actuated valve is energized, thereby causing the distribution valve to selectively direct fluid flow to only 40% of the pistons 42. Since the pressurized fluid is being distributed between fewer pistons 42a-j in the 40% mode, the pistons 42 act more rapidly, thereby causing the cam rings 44 to rotate at a higher speed for a given fluid pressure.

The hydraulic system 40 also includes a solenoid actuated freewheel valve 48, hereinafter referred to as the freewheel valve 48, which is responsive to a freewheel control signal from the electronic control 31 for controlling fluid flow to the motors 34a,34b. More specifically, when the freewheel valve 48 is deenergized, the pistons 42 in each motor 34a,34b are fully retracted as shown in FIG. 4b. When this occurs the contact between the rollers 43 and the cam rings 44 is broken which allows the associated wheels 32a,32b to rotate freely. The freewheel mode is obtained by pressurizing the motor case (not shown) through a drain port (not shown) and simultaneously connecting the distribution valve to tank (not shown) with zero back pressure. In the absence of fluid pressure, the pistons 42 are biased to their retracted position by respective bias springs (not shown). Production of the freewheel control signal will be explained in greater detail below in connection with the electronic control 31.

Referring again to FIG. 2, the electronic control 31 will be explained in greater detail. The electronic control 31 includes a controller means 50 which is electrically connected to a variety of sensors through conventional conditioning circuits (not shown) for receiving respective input signals. The controller means 50 processes these signals and responsively delivers a plurality of control signals to the supplemental drive 30 to effect operation of the supplemental drive 30 in a manner as explained below. The controller means 50 may be implemented with any suitable hardware including analog or digital circuits which may be either discrete components or integrated circuits. However, in the preferred embodiment, the controller means 50 is implemented employing a microprocessor 52 having external RAM and ROM (not shown) and being programmed to control operation of the supplemental drive 30 as explained below. A number of commercially available devices are adequate to perform the control functions, such as the MC6800 series components manufactured by Motorola, Inc of Phoenix, Ariz.

A main drive sensor means 54 senses the speed of the main drive 14 and responsively produces a main drive speed signal. The main drive sensor means 54 includes an engine speed sensor means 56 for sensing the speed of the engine 12 and producing an engine speed signal. The engine speed sensor means 56 can be any type of sensor that accurately produces an electrical signal in response engine crankshaft speed. However, in the preferred embodiment, the engine speed sensor means 56 includes a magnetic pick-up sensor 58 mounted on an engine flywheel housing (not shown) for sensing rotation of a toothed gear 60 which rotates at a speed responsive to engine crankshaft speed. The magnetic pick-up sensor 58 produces an electrical signal having a frequency responsive to the rotational speed of the gear 60 and thus engine speed.

The main drive sensor means 54 further includes a transmission sensing means 62 for sensing the transmission's gear ratio and responsively producing a gear ratio signal. More specifically, the controller means 50 is electronically connected to the transmission solenoids (not shown) for detecting the gear position of the transmission 18. An energized solenoid is associated with logic "0" and a deenergized solenoid is equated to logic "1". For each transmission gear ratio, a unique gear code signal is produced in response to the energization state of the transmission solenoids. The controller means 50 receives the gear code signal and accesses a lookup table stored in memory to determine the transmission gear ratio and responsively produces a gear ratio signal. The controller means 50 further receives the engine speed signal, calculates the speed of the main drive speed in response to the engine speed signal and gear ratio signals, and produces a main drive speed signal corresponding to the calculated speed. The main drive sensor means 54 could take numerous other forms without departing from the scope of the invention. For example, it could be embodied in a speed sensor operatively associated with an output shaft (not shown) of the transmission 18 for sensing the rotational speed of the shaft and responsively producing a signal corresponding to the speed of the main drive 14.

A vehicle speed sensor means 64 is provided for sensing the speed of the vehicle 10 relative to the ground and responsively producing a vehicle ground speed signal. The vehicle speed sensor means 64 includes a radar unit 66 mounted on the vehicle 10 for sensing the vehicle ground speed. The radar unit 66 produces an electrical signal having a frequency responsive to the speed of the vehicle 10 with respect to the ground. In the preferred embodiment, the radar unit 66 is a model Radar II Ground Speed Sensor as manufactured by the Dickey-John Corporation of Auburn, Ill.

A mode switch 68 is provided for producing a mode signal corresponding to a desired operating mode for the supplemental drive 30. The mode switch 68 is in the form of a three position switch where the three positions indicated by "O", "M", and "A" and correspond respectively to "off", "manual", and "automatic" modes of supplemental drive operation. In the "off" mode, the front drive wheels 32a,32b are free running and unpowered. In the "manual" mode, a vehicle operator is able to manually control the torque produced by the supplemental drive 30. A command lever 70 is manually movable between plurality of settings for manually control the amount of torque produced by the supplemental drive 30. A lever sensor means 72 senses the position of the command lever 70 and produces a modifier signal in response the position of the command lever 70. The modifier signal is in the form of a pulse width modulated (PWM) signal having a duty cycle corresponding the position of the command lever 70. In the "automatic" mode, the torque produced by the supplemental drive 30 is controlled in response to the level of slip in the main rear wheel drive 14. In the "automatic" mode, the command lever 70 is used to vary the relationship between rear wheel slip and the amount of torque produced by the front wheels 32a,32b, as explained below.

A pressure sensor means 74 senses the pressure of the pressurized fluid supplied to the front wheel motors 34a,34b by the pump 36 and responsively produces an actual pressure signal. The pressure sensor means 74 is in the form of a pressure transducer 76 which produces an electrical signal having a frequency responsive to the output pressure of the pump 36.

The controller means 50 is electrically connected to the clutch pedal sensor means 26, the transmission sensing means 62, the radar unit 66, the mode switch 68, the lever sensor means 72 and the pressure transducer 76 for respectively receiving the clutch pedal position, vehicle ground speed, gear code, mode, modifier, and actual pressure signals. The controller means 50 processes these signals to control the supplemental drive 30 in a manner set forth below.

Operation of the controller means 50 will be discussed in greater detail. In FIG. 4, the electrical signals have been assigned references to more readily facilitate understanding of the description. The controller means 50 includes a first calculator means 78 for receiving the gear code and engine speed signals (GC, ES), determining the speed of the rear wheels as set forth above, and responsively producing a main drive speed signal (MDS). A second calculator means 80 receives the main drive speed and vehicle ground speed signals (MDS, VS) and responsively produces a slip ratio signal (SR). More specifically, the slip ratio signal (SR) is produced in accordance with the following formula:

$$SR = \frac{(MDS - VS)}{VS}$$

The controller means 50 further includes a third calculator means 82 which receives the mode, modifier, clutch pedal position, gear code and slip ratio signals (MS, MOD, CP, GC, SR) and responsively produces a desired pressure signal (DP) which corresponds to a desired pump output pressure for the hydraulic pump 36. More specifically, the third calculator means 82 reduces the desired pressure signal (DP) to zero when the clutch pedal 22 is depressed, when the transmission 18 is in neutral, and when the supplemental drive is in the "off" mode.

When the mode signal (MS) indicates the "manual" mode, the third calculator means 82 produces a desired pressure signal (DP) having a magnitude responsive only to the magnitude of the modifier signal (MOD). During the "manual" mode, the magnitude of the desired pressure signal (DP) is varied linearly between a minimum and a maximum in response to the magnitude of the modifier signal (MOD). Preferably, the desired pressure signal (DP) is calculated using a first-order equation stored in memory which provides a desired pump pressure in response to the magnitude of the modifier signal.(MOD). However, it is understandable that the desired pressure signal (DP) could be determined using a lookup table relating modifier signal (MOD) to desired pump pressure.

Figure 5:
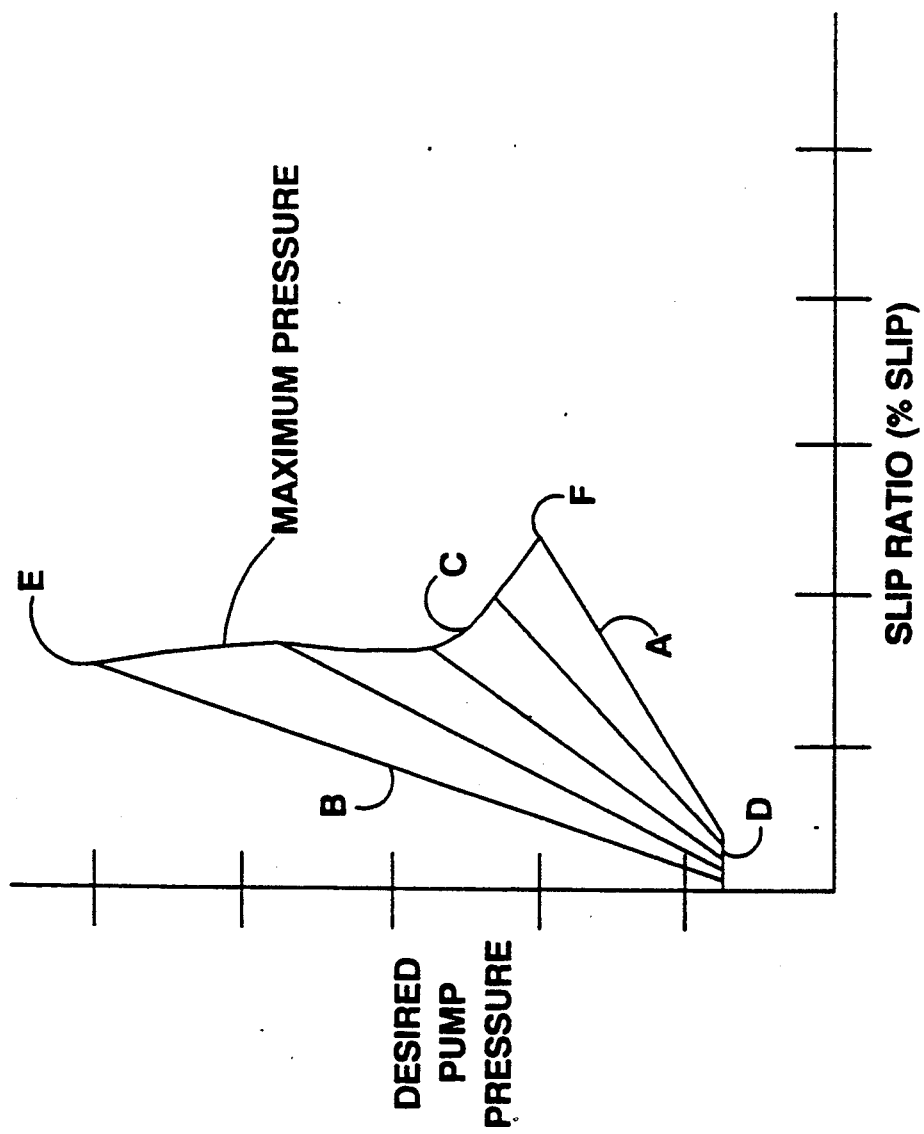
FIG. 5 is a graph illustrating the relationship between the slip ratio signal, the modifier signal, and the desired pressure signal.
Figure 6C:
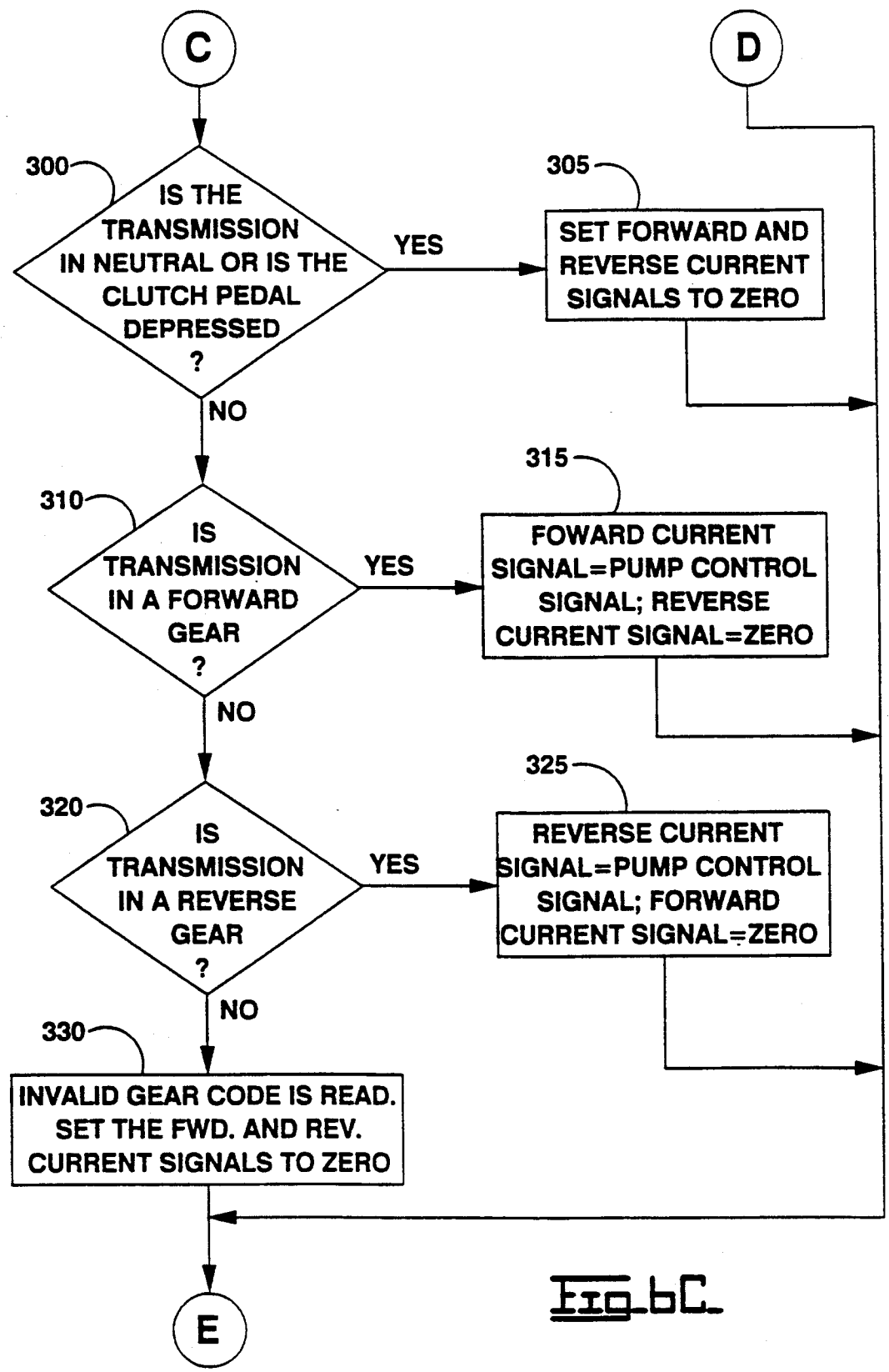
Figure 6E:
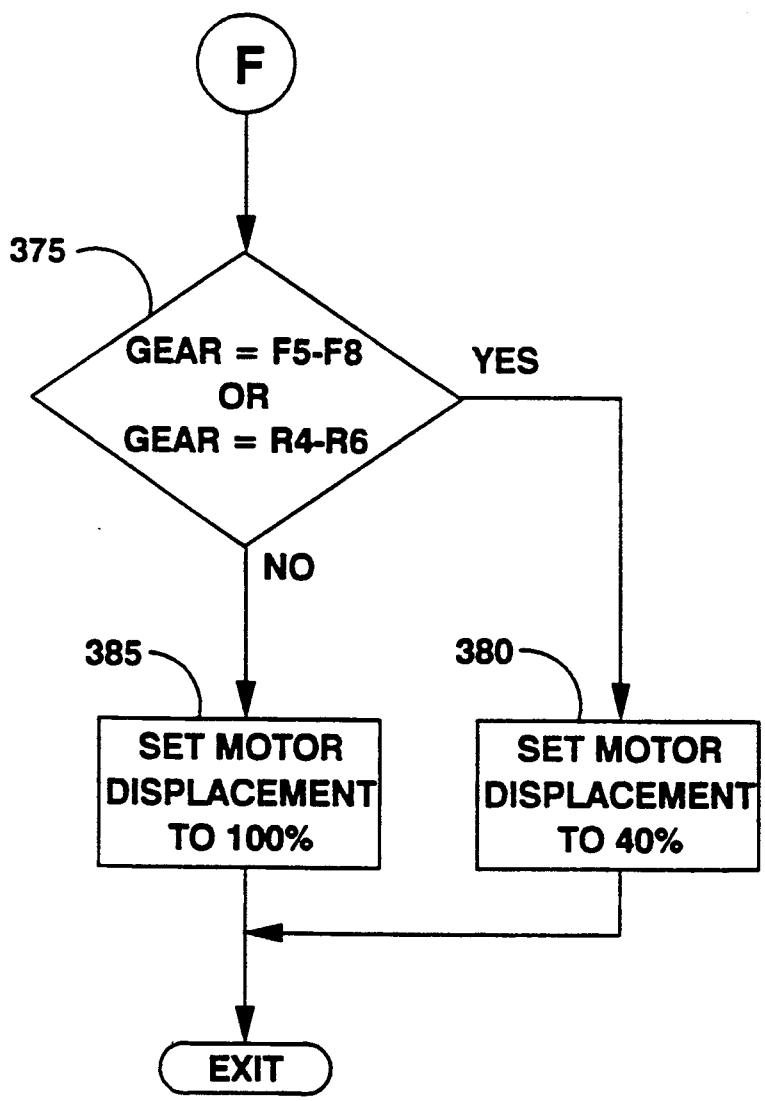

When the mode signal (MS) indicates the "automatic" mode, the third calculator means 82 produces the desired pressure signal (DP) in response to the slip ratio and modifier signals (SR, MOD). The desired pressure is again calculated using a first order equation stored in memory. However, in the "automatic" mode, the desired pressure signal (DP) is responsive to the magnitude of the slip ratio signal (SR), and the modifier signal (MOD) is used to vary the slope of the equation relating these values. The relationship between the slip ratio, modifier and desired pressure signals (SR, MOD, DP) can best be understood by referring to FIG. 5. When the modifier signal (MOD) is at its minimum, the desired pressure signal (DP) varies linearly between a minimum and a maximum at a first predetermined slope, as shown by line A. As the modifier signal (MOD) increases, the slope of the equation relating the desired pressure signal (DP) and the slip ratio signal (SR) is increased to make the supplemental drive 30 more responsive to the slip ratio signal (SR). When the modifier signal (MOD) is at its maximum, the relationship between the desired pressure and slip ratio signals (DP, SR) varies linearly between a minimum and a maximum at second predetermined slope, as shown by line B. The magnitude of the minimum pressure is fixed at 700 psi, as indicated by point D, to ensure that the motor pistons 42 engage the cam rings 44 during the automatic mode.

During the "automatic mode", the maximum pressure limit is set in response to the modifier signal (MOD). More specifically, the maximum pressure limit is set to the maximum fluid pressure allowed in the supplemental drive 30, as indicated by point E, when the modifier signal (MOD) is at its maximum. As the magnitude of the modifier signal (MOD) decreases, the maximum pressure limit is reduced linearly. When the modifier signal (MOD) is at its minimum, the maximum pressure limit is set at an empirically determined value limit of 2000 psi as indicated by point F. The values of the maximum pressure limit varies between 2000 psi and 5000 psi in response to the magnitude of the modifier signal (MOD). The maximum pressure limit is varied in this manner so that the operator can manually control the amount of torque produced by the supplemental drive 30.

A fourth calculator means 84 receives the desired and actual pressure signals (DP, AP) and produces an error signal ($e_P$) response to a difference between the desired and actual pressure signals (DP, AP). The fourth calculator means 84 further processes the error signal ($e_P$) to produce a pump control signal (PC) which is ultimately applied to the actuator means 38 to control the displacement of the pump 36. The fourth calculator means 84 includes a PID means 86 which receives the error signal ($e_P$) and responsively produces the pump control signal (PC) at least in part according to the following formula:

$$Control\ Signal = K_1 e_P + \Sigma K_2 e_P + K_3 \Delta e_p$$

where ($e_P$) represents the error signal and $K_1$, $K_2$, $K_3$ are predetermined constants.

In such an application, a PID control is advantageous over both proportional and proportional integral controls because it is more responsive and has better stability in the absence of an error signal ($e_P$). More specifically, the second term, or the integrating term, is provided to keep the pump 36 at the proper displacement in the absence of an error signal ($e_P$). If the integrating term is not used, some type of servo mechanism, such as a mechanical servo, must be provided to accomplish this function. This is undesirable because it adds to the cost and complexity of the supplemental drive system 30. The third term, or the differentiating term, makes the control more responsive because it responds to the rate of change of the error signal ($e_P$). As such it serves to predict the future behavior of the error signal ($e_P$), thereby allowing the control to respond more quickly to changes in the error signal ($e_P$).

A pump signal generator means 88 receives the mode, clutch pedal position, gear code, and pump control signals (MS, CP, GC, PC). The pump signal generator means 88 processes these signals to determine the current operating mode of the main drive 14 and controls the supplemental drive 30 accordingly. More specifically, the pump signal generator means 88 sets the magnitude of the forward and reverse pump current signals (FPC, RPC) in response to the received signals. The forward and reverse pump current signals (FPC, RPC) are respectively delivered to the forward and reverse pump actuators for controlling pump direction and displacement in a conventional manner. If the gear code signal (GC) indicates that the main transmission 18 is in either 8th gear forward, neutral, or 6th gear reverse, the forward and reverse pump current signals (FPC, RPC) are both set to zero. The forward and reverse pump current signals (FPC, RPC) are also set to zero when the clutch pedal 22 is depressed. If the transmission 18 is in forward gears 1-7 the forward pump current signal (FPC) is set to the value of the pump control signal (PC) and the reverse pump current signal (RPC) is set to zero. Conversely, if the transmission 18 is in reverse gears 1-5 the reverse pump current signal (RPC) is set to the value of the pump control signal (PC) and the forward pump current signal (FPC) is set to zero.

A motor displacement selector means 90 receives the gear code signal (GC) and responsively produces the motor displacement signal (MD). The motor displacement signal (MD) is in the form of a current signal which is either "off" or "on" at a level required to energize the solenoid actuated valve of the motor displacement means 46. When the solenoid actuated valve is energize, the motors 34a,34b are at 40% displacement, and when the solenoid actuated valve is deenergized the motors 34a, 34b are at 100% displacement. The motor displacement selector 90 checks the gear code signal (GC) and sets the magnitude of the motor displacement signal (MD) appropriately. For example, if the gear code signal (GC) indicates that the transmission 18 is in forward gears 1-4 or reverse gears 1-3, the motor displacement signal (MD) is turned "off", thereby deenergizing the solenoid actuated valve. When the transmission 18 is in forward gears 5-8 or reverse gears 4-6, the motor displacement signal (MD) is turned "on", thereby energizing the solenoid actuated valve.

A freewheel driver means 92 receives the mode, gear code and clutch position signals (MS, GC, CP) and selectively produces a freewheel signal (FW) which is delivered to the freewheel valve 48. The freewheel signal (FW) is either "off" or "on" at a magnitude required to energize the freewheel valve 48. The freewheel signal (FW) is "off" if the mode switch 68 is in the "off" position or if the clutch pedal 22 is depressed. Furthermore, the freewheel signal (FW) is "off" if the main transmission 18 is in either neutral, 8th gear forward or 6th gear reverse, thereby preventing operation of the supplemental drive 30 at high ground speeds.

Referring now to FIGS. 6A-E, flow diagrams which can be used to program the microprocessor 52 to perform certain functions immediate vehicle drive control will be discussed. Initially, in the block 205, input signals from the various sensor are read and variables in memory are set in accordance with the sensed values. Next in the block 210, the main drive speed signal (MDS) is produced in response to the gear code and engine speed signals (GC, ES). The gear code signal (GC) is used to access a lookup table stored in memory for determining the gear ratio of the main transmission 18. The lookup table produces a unique gear ratio signal (GR) for each transmission gear ratio in response to the gear code signal (GC). The gear ratio and engine speed signals (GR, ES) are used in the following formula, to produce the main drive speed signal (MDS):

$$MDS = \frac{ES}{GR} * 2\pi R$$

where R represents the rolling radius of the main drive tires.

Thereafter, in the block 215 the slip ratio signal (SR) is produced in response to the magnitude of the vehicle ground speed and main drive speed signals (VS, MDS). The following formula is stored in memory and accessed to produce the slip ratio:

$$SR = \frac{(MDS - VS)}{MDS}$$

As can be seen from the formula, the slip ratio signal (SR) ranges between 0% and 100% and is more responsive at lower ground speeds. More particularly, for a given difference between the main drive and vehicle ground speed signals (MDS, VS), the magnitude of the slip ratio signal (SR) will decrease as the main drive speed signal (MDS) increases.

Next a desired pressure routine is executed in the blocks 225-260 to determine a desired pump pressure and responsively produce the desired pressure signal (DP). In the block 225, the mode signal (MS) is examined and desired pressure signal (DP) is set to zero in the block 230 if the mode signal (MS) corresponds to "off". If the mode signal (MS) does not correspond to "off", control is passed to the block 235 where the clutch pedal and gear code signals (CP, GC) are examined. If it is determined that the clutch pedal 22 is depressed or the transmission 18 is in neutral, control is passed to the block 240 where desired pressure signal (DP) is set to zero.

Otherwise control is passed to the block 245 where the mode signal (MS) is checked to determine if the supplemental drive 30 is in the "manual" mode. If it is, control is passed to the block 250 where the value of the desired pressure signal (DP) is determined in response to the modifier signal (MOD). The desired pressure signal (DP) is calculated in accordance with the following formula:

DP=SLOPE*MOD+PMIN where SLOPE is an empirically selected constant corresponding to the slope, and PMIN represents the first predetermined limit of 700 psi. The above formula is stored in memory and accessed by the microprocessor 52 to calculate the desired pressure signal (DP). In the blocks 251-252, the desired pressure signal (DP) is limited to the lesser of the desired pressure signal (DP) as calculated in the block 245 and the maximum system pressure (PMAX) of 5000 psi.

If, in the block 245, it is determined that the supplemental drive 30 is not in the "manual" mode, control is passed to the block 255. In the block 255 the mode signal (MS) is again checked to determine if the supplemental drive 30 is in the "automatic" mode. If it is not, the mode signal (MS) is assumed to be invalid and the desired pressure signal (DP) is set to zero in the block 260. If the mode is "manual", control is passed to the block 265 where the slip/pressure slope signal (SPSLOPE ) is produced in response to the magnitude of the modifier signal (MS). The slip pressure slope signal (SPSLOPE) is produced in accordance with the following formula:

SPSLOPE=MOD*K+SPMIN where K is an empirically determined constant and SPMIN is the minimum value allowed for the slip pressure slope signal (SPSLOPE).

Control is then passed to the block 270 where the desired pressure signal (DP) is produced in accordance with the following formula:

DP=SPSLOPE*SR+PMIN where PMIN represents the first predetermined limit of 700 psi. The above formula is stored in memory and accessed by the microprocessor 52 to calculate the desired pressure signal (DP).

Thereafter control is passed to the block 271 where a pressure signal (PMAX) is produced. The maximum pressure signal (PMAX) corresponds to the maximum allowable pressure as limited by the command lever, and is produced in accordance with the following formula:

$$PMAX = \frac{PRANGE}{INC} * MOD + OFFSET$$

where PRANGE is a constant representing the range of maximum pressure values (3000 psi), INC is a constant representing the number of discrete settings (204) of the command lever 70, and POFFSET is a constant representing a pressure offset of 2000 psi. The above formula has the effect of varying the maximum pressure signal (PMAX) linearly between 2000 psi and 5000 psi in response to the magnitude of the modifier signal (MOD).

In the blocks 272-273, the desired pressure signal (DP) is limited to the lesser of the desired pressure signal (D) from the block 271 and the maximum pressure signal (PMAX) as calculated in the block 271.

Next, in the block 275, an error signal ($e_P$) is produced in response to a difference between the desired and actual pressure signals (DP, AP). Control is then passed to the block 280 where the pump control signal (PC) is calculated in accordance with the following equation:

$$PC = K_1 e_P + \Sigma K_2 e_P K_3 \Delta e_P$$

where $K_1$, $K_2$, $K_3$ are predetermined constants stored in memory.

Thereafter, control is passed to a pump signal generator routine which is shown in the blocks 290-330. The pump signal generator routine processes the mode, clutch pedal position, gear code and pump control signals (MS, CP, GC, PC) to control operation of the supplemental drive 30. In the block 290 the mode signal (MS) is checked, and control is passed to the block 295 if the mode signal (MS) does not corresponds either to "manual" or "automatic" modes of operation. In the block 295 the forward and reverse pump current signals (FPC, RPC) are both set to zero and then control is passed to the block 335 to begin execution of a freewheel routine as explained below.

Otherwise, control is passed to the block 300 where the gear code and clutch pedal signals (GC, CP) are examined. If the clutch pedal 22 is depressed or the transmission 18 is in neutral, control is passed to the block 305 where the forward and reverse pump current signals (FPC, RPC) are both set to zero. Thereafter, control is routed to the block 335.

If the tests in block 300 are negative, control is passed to the block 310 where the gear code signal (GC) is examined to determine if the transmission 18 is in a forward gear. If it is, control is passed to the block 315 where forward pump current signal (FPC) is set to the control signal and reverse pump current signal (RPC) is set to zero and control is routed to the block 335.

If the transmission 18 is not in a forward gear, control is passed to the block 320 where the gear code signal (GC) is again examined to determine if the transmission 18 is in a reverse gear. If it is, control is passed to the block 325 where reverse pump current signal (RPC) is set to the control signal and forward pump current signal (FPC) is set to zero Control is then passed to the block 335 from the block 320.

Conversely, if in the block 320 it is determined that the transmission 18 is not in a reverse gear, the gear code signal (GC) is assumed to be invalid and control is passed to the block 330. In the block 330 the forward and reverse pump current signals (FPC, RPC) are both set to zero.

Thereafter control is passed to the block 335. The block 335 is the start of a freewheel control routine which continues through the block 370. In the block 335 the mode signal (MS) is examined and control is passed to the block 345 if the mode signal (MS) does not correspond to either the "manual" or "automatic" modes. In the block 345 the freewheel signal (FW) is turned "off", thereby deenergizing the freewheel valve 48 and causing the motors 34a,34b to "freewheel" as explained above. Subsequently, control is passed to the block 375 from the block 345.

Otherwise control is passed to the block 350 where the clutch pedal signal (CP) is examined to determine if the clutch pedal 22 is depressed. If it is, control is passed to the block 355 where the freewheel signal (FW) is turned "off". This is done to prevent operation to disable the supplemental drive 30 when the main transmission is in neutral. Thereafter, control is routed to the block 375 from the block 355.

However, if the clutch pedal 22 is not depressed, control is passed to the block 360 where the gear code signal (GC) is examined to determine the operating gear of the main transmission 18. If the transmission 18 is in neutral, forward gear 8, or reverse gear 6 control is passed to the block 365 where the freewheel signal (FW) is turned "off" and control is passed to the block 375. Otherwise control is passed to the block 370 where the freewheel signal (FW) is turned "on", causing the freewheel valve 48 to become energized. Control is then passed to the block 375 where the gear code signal (GC) is again examined. If the gear code signal (GC) indicates that the main transmission 18 is in forward gears 5-8 or reverse gears 4-6, the motor displacement signal (MD) is turned "on", thereby causing the motors 34a,34b to operate at 40% displacement. Otherwise the motor displacement signal (MD) is turned "off", thereby causing the motors 34a, 34b to operate at 100% displacement.

The above supplemental drive routine is repeatedly executed throughout operation of the vehicle 10 for producing efficient operation of the supplemental drive 30.

INDUSTRIAL APPLICABILITY

Assume that the vehicle 10 is initially operating in the "automatic" mode and that no rear wheel slip exists. The slip ratio signal (SR) is at its minimum since the vehicle ground speed and main drive speed signals are equal. The processor means 52 will operate to keep the system pressure in the supplemental drive 30 at the preselected minimum of 700 psi, thereby keeping the motor pistons 42 in engagement with the cam rings 44. If the rear wheels 16 begin to slip, the magnitude of the slip ratio signal (SR) will increase thereby increasing the desired pressure signal (DP). The processor means 52 responsively increases the magnitude of the pump control signal (PC). This in turn causes the pump displacement to increase, thereby resulting in an increased amount of supplemental drive assist. As the slip in the rear wheels decreases, the amount of supplemental assist is automatically reduced in response to the decreasing slip ratio signal (SR). In the "automatic" mode, the operator can vary responsiveness of the supplemental drive 30 by moving the command lever 70 to adjust the modifier signal (MOD).

If the vehicle operator subsequently moves the mode switch to the "manual" mode, the supplemental drive 30 is operated in response to the setting of the control lever 70. In the "manual" mode, the operator can vary the amount of torque produced by the supplemental drive 30 by moving the control lever to increase or decrease the magnitude of the modifier signal (MOD). If working conditions are such that the supplemental front wheel drive (30) is not desired, the operator can select the "off" mode using the mode switch. This causes the processor means 52 to reduce the forward and reverse pump control signals (FPC, RPC) to zero and to turn the freewheel signal (FW) "off", thereby eliminating power to the front wheels 32a,32b. Other aspects, objects, and advantages of this invention can be obtained from a study of the drawings, the disclosure, and the appended claims.

What is claimed is:

1. An electronic control for a vehicle having an engine, a main drive driven by said engine, a fluid pump driven by said engine for providing pressurized fluid, and a supplemental drive driven by said pressurized fluid, comprising:

main drive sensor means for sensing the speed of the main drive and responsively producing a main drive speed signal;

vehicle speed sensor means for sensing the speed of said vehicle relative to the ground irrespective of wheelslip and responsively producing a vehicle ground speed signal; and processor means for receiving said main drive speed signal and vehicle ground speed signal, producing an error signal in response to the received signals and controlling the pressure in said supplemental drive in response to said error signal.

2. An electronic control as set forth in claim 1 wherein the torque produced by said supplemental drive varies in response to the magnitude of said slip ratio signal.

3. An electronic control as set forth in claim 2 wherein the torque produced by said supplemental drive varies proportionally to the magnitude of said slip ratio signal.

4. An electronic control as set forth in claim 2 wherein said processor means is operative to reduce the torque produced by said supplemental drive to zero when said slip ratio signal is at a magnitude associated with zero slip in the main drive system.

5. An electronic control as set forth in claim 1 wherein said processor means controls the fluid pressure in said supplemental drive in a manner so as to reduce said error signal to zero.

6. An electronic control as set forth in claim 5 further comprising:
   actuator means for receiving a control signal and responsively adjusting said pump so as to vary the pressure of the pressurized fluid produced by said pump in response to said control signal; and
   wherein said processor means is operative for producing said control signal in response to said error signal.

7. An electronic control as set forth in claim 1 wherein said processor means includes a PID means for receiving said error signal and responsively producing said control signal at least in part according to the following formula:

$$\text{Control Signal} = K_1 e_P + \Sigma K_2 e_P + K_3 \Delta e_P$$

where $e_P$ represents said error signal and $K_1$, $K_2$, $K_3$ are predetermined constants.

8. An apparatus as set forth in claim 1 wherein said processor means processes said received signals to produce a slip ratio signal responsive to a ratio of said main drive speed and vehicle ground speed signals and produces said error signal in response to said slip ratio signal.

9. An electronic control as set forth in claim 8 wherein said slip ratio signal is produced in accordance with the following formula:

$$\text{Slip Ratio} = \frac{(MDS - VS)}{MDS}$$

where MDS represents the main drive speed signal and VS represents the vehicle ground speed signal.

10. An electronic control as set forth in claim 8 wherein the magnitude of said desired pressure signal varies linearly between first and second predetermined limits in response to the magnitude of said slip ratio signal, said second predetermined limit being larger than said first predetermined limit.

11. An electronic control as set forth in claim 8 further comprising:
   a manually operable command lever having a plurality of settings;
   lever sensor means for sensing the position of said command lever and producing a modifier signal in response the position of said command lever; and
   wherein said processor means further receives said modifier signal and responsively modifies said desired pressure signal such that the relationship between said slip ratio and desired pressure signals is further responsive to said modifier signal.

12. An electronic control as set forth in claim 11 wherein the magnitude of said desired pressure signal varies linearly between first and second predetermined limits in response to the magnitude of said slip ratio and modifier signals, said second predetermined limit being larger than said first predetermined limit.

13. An electronic control as set forth in claim 12 wherein the magnitude of said second predetermined limit is responsive to the magnitude of said modifier signal.

14. In a vehicle having an engine, a transmission driven by said engine and being shiftable between a plurality of forward and reverse gears and neutral, a gear selector movable between a plurality of forward and reverse positions and a neutral position to respectively effect shifting of said transmission between the forward gears, the reverse gears and neutral, a pair of rear drive wheels driven by an output of said transmission through a differential, said main drive wheels being operative to propel said vehicle, a variable displacement pump driven by said engine for providing pressurized fluid, means for receiving forward and reverse pump current signals and controlling the displacement of said pump and direction of fluid flow therefrom in response to said received signals, a pair of reversible hydraulic motors being driven by said pressurized fluid, a pair of drive wheels driven respectively by said hydraulic motors and being operative to propel said vehicle, an electronic control comprising:
   vehicle speed sensor means for sensing the speed of said vehicle relative to the ground and responsively producing a vehicle ground speed signal;
   transmission sensing means for sensing the gear ratio of said transmission and responsively producing a gear code signal;
   pressure sensor means for sensing the pressure of the pressurized fluid supplied to said supplemental drive by said pump and responsively producing an actual pressure signal;
   a manually operable command lever having a plurality of settings;
   lever sensor means for sensing the position of said command lever and producing a modifier signal in response the position of said command lever;
   clutch pedal sensor means for sensing the position of a manually operable clutch pedal and responsively producing a clutch pedal position signal;
   a manually operable mode switch being movable between three positions corresponding respectively to "Off", "Manual" and "Automatic" modes of supplemental drive operation, said mode switch being adapted for producing a mode signal correlative to the position of said switch;
   a second calculator means for receiving said main drive speed and vehicle ground speed signals and responsively producing a slip ratio signal, said slip ratio signal being calculated in accordance with the following equation:

$$\text{Slip Ratio} = \frac{(MDS - VS)}{MDS}$$

where MDS represents said main drive speed signal and VS represents said vehicle ground speed signal;

third calculator means for receiving said mode, modifier, clutch pedal position, gear code, and slip ratio signals and responsively producing a desired pressure signal which corresponds to a desired pump output pressure;

fourth calculator means for receiving said desired and actual pressure signals, producing an error signal responsive to a difference between said received signals; and producing a pump control signal responsive to said error signal;

pump signal generator means for receiving said clutch pedal position, gear code, and pump control signals, and selectively producing one of said forward and reverse pump current signal in response to said received signals.

15. A method for operating an electronic control in a vehicle having an engine, a main drive driven by said engine, a fluid pump driven by said engine for providing pressurized fluid, and a supplemental drive driven by said pressurized fluid, comprising the steps of:

sensing the speed of the main drive and responsively producing a main drive speed signal;

sensing the speed of said vehicle relative to the ground irrespective of wheelslip and responsively producing a vehicle ground speed signal;

sensing the pressure of the pressurized fluid supplied to said supplemental drive by said pump and responsively producing an actual pressure signal;

producing a slip ratio signal responsive to a ratio of said main drive speed and vehicle ground speed signals;

producing a desired pressure signal responsive to said slip ratio signal;

calculating an error signal responsive to a difference between said desired and actual pressure signals; and controlling the fluid pressure in said supplemental drive in response to said error signal.

16. An electronic control for a vehicle having an engine, a main drive driven by said engine, a fluid pump driven by said engine for providing pressurized fluid, and a supplemental drive driven by said pressurized fluid, comprising:

main drive sensor means for sensing the speed of the main drive and responsively producing a main drive speed signal;

a vehicle speed sensor means including a radar for sensing the speed of said vehicle relative to the ground and responsively producing a vehicle ground speed signal; and processor means for receiving said main drive speed signal and vehicle ground speed signal, producing an error signal in response to the received signals and controlling the pressure in said supplemental drive in response to said error signal.

17. A method for operating an electronic control in a vehicle having an engine, a main drive driven by said engine, a fluid pump driven by said engine for providing pressurized fluid, and a supplemental drive driven by said pressurized fluid, comprising the steps of:

sensing the speed of the main drive and responsively producing a main drive speed signal;

sensing the speed of said vehicle relative to the ground via a Doppler-type sensor and responsively producing a vehicle ground speed signal;

sensing the pressure of the pressurized fluid supplied to said supplemental drive by said pump and responsively producing an actual pressure signal;

producing a slip ratio signal responsive to a ratio of said main drive speed and vehicle ground speed signals;

producing a desired pressure signal responsive to said slip ratio signal;

calculating an error signal responsive to a difference between said desired and actual pressure signals; and controlling the fluid pressure in said supplemental drive in response to said error signal.

18. An electronic control for a vehicle having an engine, a main drive driven by said engine, a fluid pump driven by said engine for providing pressurized fluid, and a supplemental drive driven by said pressurized fluid, comprising:

main drive sensor means for sensing the speed of the main drive and responsively producing a main drive speed signal;

a radar unit for sensing the speed of said vehicle relative to the ground and responsively producing a vehicle ground speed signal having a frequency responsive to the speed of said vehicle with respect to the ground;

pressure sensor means for sensing the pressure of the pressurized fluid supplied to said supplemental drive by said pump and responsively producing an actual pressure signal; and processor means for receiving said main drive speed, vehicle ground speed, and actual pressure signals, producing a slip ratio signal responsive to a ratio of said main drive speed and vehicle ground speed signals, producing a desired pressure signal responsive to said slip ratio signal, calculating an error signal responsive to a difference between said desired and actual pressure signals, and controlling the fluid pressure in said supplemental drive in response to said error signal.

19. An electronic control for a vehicle having an engine, a main drive driven by said engine, a fluid pump driven by said engine for providing pressurized fluid, and a supplemental drive driven by said pressurized fluid, comprising:

main drive sensor means for sensing the speed of the main drive and responsively producing a main drive speed signal;

a Doppler-type sensor for sensing the speed of said vehicle relative to the ground and responsively producing a vehicle ground speed signal;

pressure sensor means for sensing the pressure of the pressurized fluid supplied to said supplemental drive by said pump and responsively producing an actual pressure signal; and processor means for receiving said main drive speed, vehicle ground speed, and actual pressure signals, producing a slip ratio signal responsive to a ratio of said main drive speed and vehicle ground speed signals, producing a desired pressure signal responsive to said slip ratio signal, calculating an error signal responsive to a difference between said desired and actual pressure signals, and controlling the fluid pressure in said supplemental drive in response to said error signal.

* * * * *